(12) United States Patent
Kano et al.

(10) Patent No.: US 7,225,041 B2
(45) Date of Patent: *May 29, 2007

(54) INFORMATION PROVIDING METHOD AND SYSTEM

(75) Inventors: Ichiro Kano, Yokohama (JP); Kaoru Mizushiri, Tochigi (JP); Masahiro Ohtake, Tochigi (JP); Hideki Ina, Kanagawa (JP); Shinji Utamura, Tochigi (JP); Nobuaki Ogushi, Tochigi (JP); Masaya Ogura, Tokyo (JP); Takashi Sugimori, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/283,929

(22) Filed: Nov. 22, 2005

(65) Prior Publication Data
US 2006/0074507 A1  Apr. 6, 2006

Related U.S. Application Data

(63) Continuation of application No. 09/971,648, filed on Oct. 9, 2001, now Pat. No. 6,980,872.

(30) Foreign Application Priority Data
Oct. 18, 2000 (JP) .............................. 2000-318069

(51) Int. Cl.
*G06F 19/00* (2006.01)
(52) U.S. Cl. .................................. 700/108; 702/182
(58) Field of Classification Search ........ 700/108–110, 700/121, 111, 174, 175, 177
See application file for complete search history.

(56) References Cited

U.S. PATENT DOCUMENTS

| 5,984,507 A | 11/1999 | Edens .................. 364/478.08 |
| 6,170,019 B1 | 1/2001 | Dresel et al. ............... 709/304 |
| 6,175,934 B1 | 1/2001 | Hershey et al. .............. 714/25 |
| 6,438,438 B1 | 8/2002 | Takagi et al. ............... 700/121 |
| 6,535,785 B2 | 3/2003 | Johnson et al. ............. 700/121 |
| 6,634,008 B1 | 10/2003 | Dole ............................ 716/1 |
| 6,654,489 B2 | 11/2003 | Wiley et al. ................ 382/144 |
| 2001/0034567 A1 | 10/2001 | Allen et al. ................. 700/283 |
| 2002/0046140 A1 | 4/2002 | Kano et al. ................... 705/27 |
| 2002/0188706 A1 | 12/2002 | Richards et al. ............ 709/223 |
| 2003/0005107 A1 | 1/2003 | Dulberg et al. ............. 709/223 |

FOREIGN PATENT DOCUMENTS

| EP | 0 822 473 A2 | 2/1998 |
| JP | 5-251308 | 9/1993 |
| JP | 10-97966 | 4/1998 |

OTHER PUBLICATIONS

Matsui, Yoshiya, "Lens Design Method," *Kyoritsu Shuppan*, pp. 129-137.

*Primary Examiner*—Zoila Cabrera
(74) *Attorney, Agent, or Firm*—Fitzpatrick, Cella, Harper & Scinto

(57) ABSTRACT

An information providing system includes a reception unit that receives first information concerning a process to be performed by an apparatus from a customer via a network, a processing unit which simulates the process based on the first information and prepares second information based on a result of the simulation, and a transmission unit which transmits the second information to the customer via a network.

39 Claims, 7 Drawing Sheets

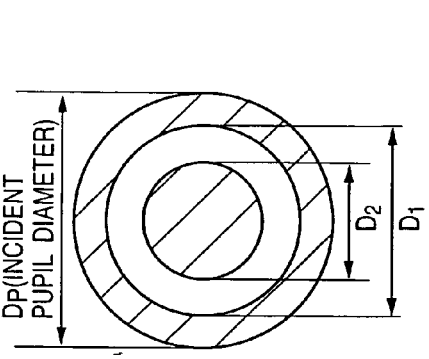
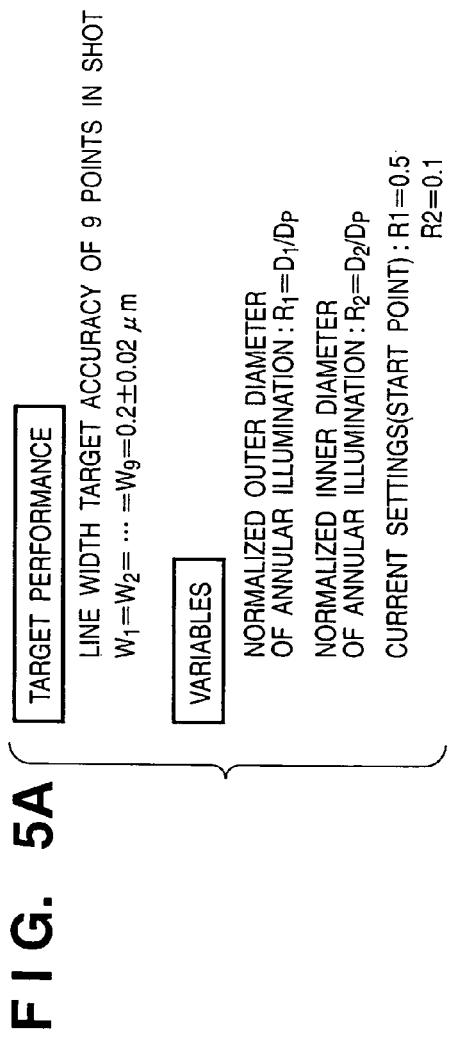
FIG. 5A
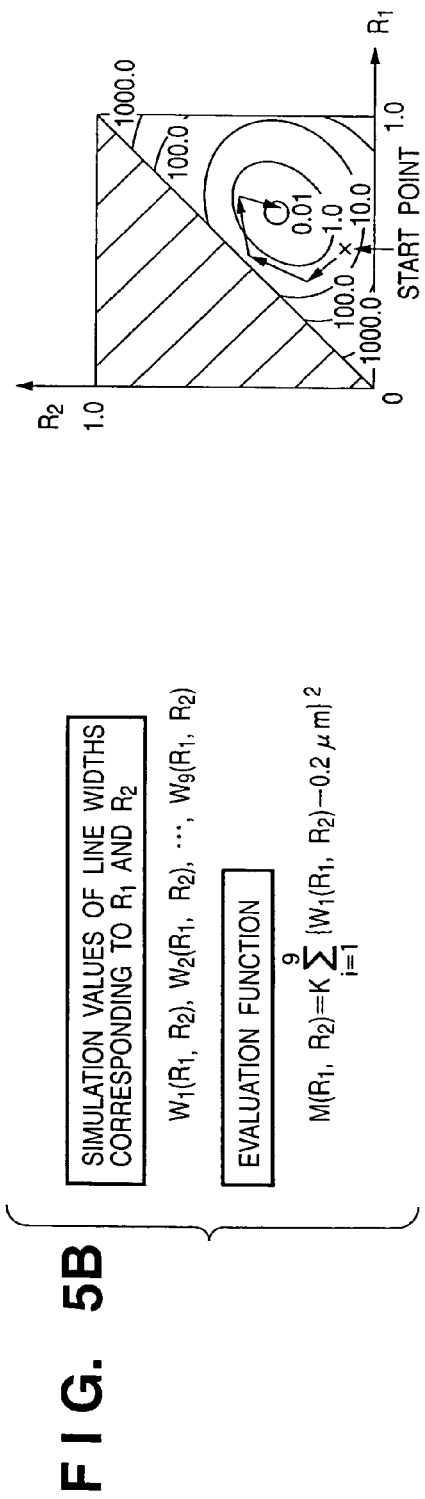
FIG. 5B

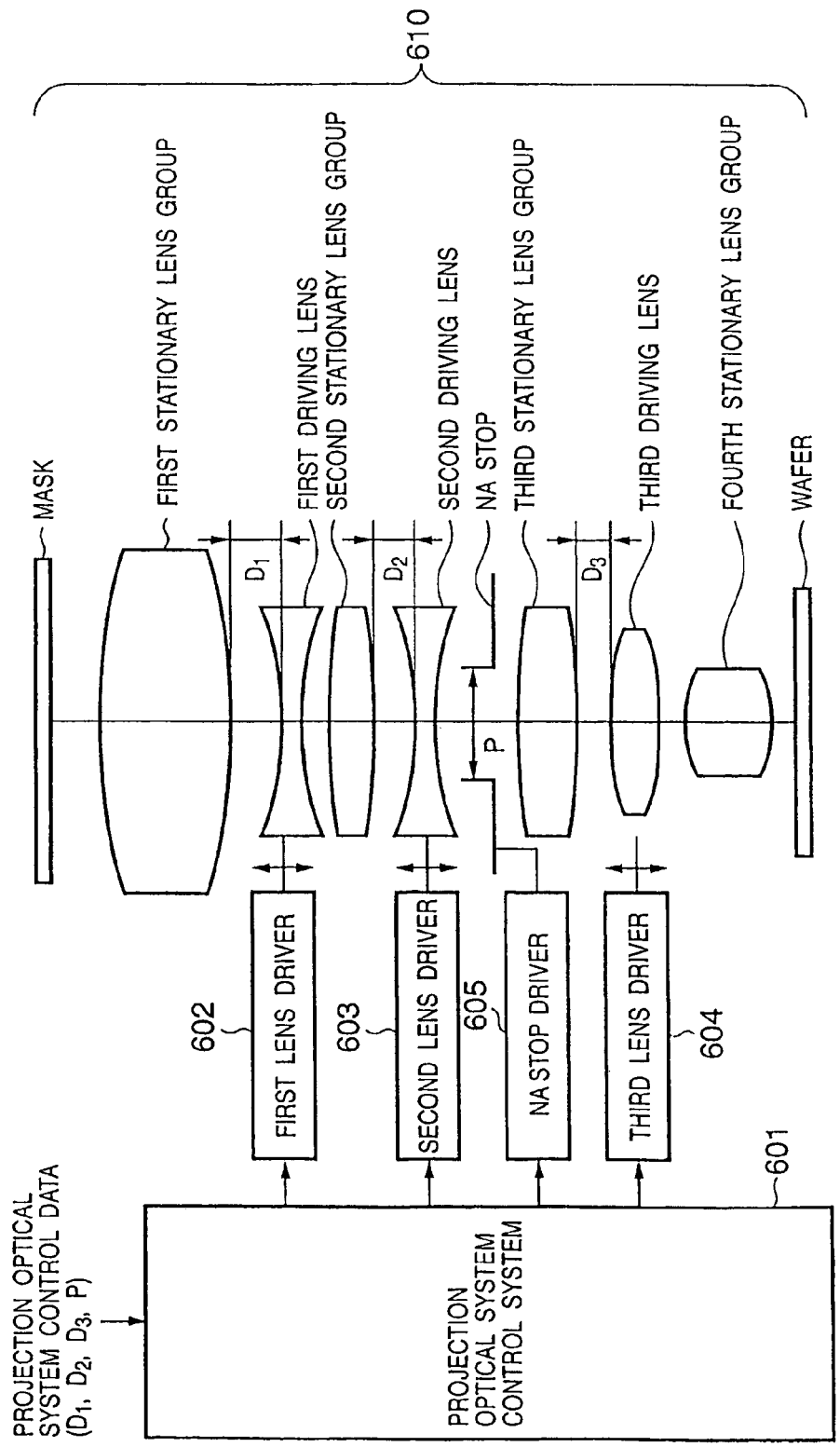

INFORMATION PROVIDING METHOD AND SYSTEM

This application is a continuation application of U.S. patent application Ser. No. 09/971,648, filed Oct. 9, 2001 now U.S. Pat. No. 6,980,872.

FIELD OF THE INVENTION

The present invention relates to an information providing method and system for providing information concerning an apparatus such as an exposure apparatus.

BACKGROUND OF THE INVENTION

Among apparatuses for manufacturing devices such as semiconductor devices or flat panel displays, an exposure apparatus is one of the apparatuses whose performance greatly influences productivity of devices. The productivity of devices in an exposure apparatus greatly depends on services in a broad sense such as installation and maintenance of the apparatus upon selling it to a customer, optimization of apparatus use conditions under the device and production conditions of a customer, upgrading of software and hardware, and consultation concerning the method of using the apparatus as well as the apparatus performance. A customer generally considers the contents of services and decides on the best manufacturer. From this viewpoint, these services become important. These services are conventionally offered in the presence of a serviceman or the manufacturer in a customer's factory, or by a personal visit, or by communication using telephone, facsimile, mail, or electronic mail. Along with an increase in the number of apparatuses in operation, an increase in apparatus operating area, and sophistication of service contents, human and temporal loads are increasing. In the future, any countermeasure must be taken to maintain providing advanced services quickly. As one of the countermeasures for solving this problem, a remote maintenance system using the Internet is disclosed in Japanese Patent Laid-Open No. 10-97966. According to this system, information concerning trouble of industrial equipment is acquired via the Internet or registered in a database. A trouble remedy is searched in the database, thereby improving the efficiency of apparatus maintenance.

It is insufficient as services to simply acquire information concerning trouble, and to search the database for the corresponding remedy and to provide only the remedy to the customer. To quickly determine the use conditions of an apparatus installed in a customer's factory or the like, the performance of this apparatus must be simulated using the data of the apparatus at present. Most of the apparatus data involved the know-how unique to the apparatus supplier and cannot often be disclosed to the customer. The apparatus supplier receives a customer's request and must inevitably perform a simulation in response to this request and send back the simulation result to the customer. It takes a long period of time until the use conditions of the apparatus are determined. This may interfere with device production. Condition optimization in the device manufacture is not only limited to correction of the use conditions of the apparatus, but also extends to correction of a mask. This prolongs the optimization time.

SUMMARY OF THE INVENTION

The present invention has been made in consideration of the above situation, and has as its object to quickly provide information (e.g., performance and optimal conditions) concerning an apparatus such as an exposure apparatus under the conditions (e.g., use conditions and target performance) concerning the use of the apparatus.

According to an aspect of the present invention, there is provided an information providing method of providing to a customer information concerning an apparatus used by the customer by using a data communication network, the method comprising the reception step of receiving a condition associated with the use of the apparatus from the customer using the apparatus via the data communication network, the data processing step of preparing information concerning the apparatus under the condition received in the reception step, by using secret apparatus data concerning the apparatus under the management of a supplier of the apparatus, and the transmission step of transmitting to the customer via the data communication network the information prepared in the data processing step.

According to a preferred embodiment of the present invention, the data processing step preferably includes the step of preparing by simulation information concerning performance of the apparatus under the condition received in the reception step.

According to a preferred embodiment of the present invention, the secret apparatus data preferably contains at least one of design data, manufacturing data, performance measurement data, set value, and allowable error of the apparatus.

According to a preferred embodiment of the present invention, the reception step preferably includes the step of receiving performance data representing current performance of the apparatus from the customer.

According to a preferred embodiment of the present invention, the reception step preferably includes the step of receiving, from an inspection unit for inspecting the performance of the apparatus, an inspection result by the inspection unit as performance data representing current performance of the apparatus.

According to a preferred embodiment of the present invention, the reception step preferably includes the step of receiving from the customer intermediate data representing intermediate performance to be reflected on final performance of the apparatus.

According to a preferred embodiment of the present invention, a service provider for providing information may be a supplier of the apparatus. Alternatively, a service provider for providing information may be different from a supplier of the apparatus. In the latter case, the service provider uses the apparatus data under the management of the supplier of the apparatus.

According to a preferred embodiment of the present invention, preferably, the condition associated with the use of the apparatus includes target performance concerning the apparatus, and the data processing step includes the optimization step of preparing information for optimizing a condition in use of the apparatus on the basis of the target performance.

According to a preferred embodiment of the present invention, the method preferably farther comprises the registration step of registering an optimization result in the optimization step in a database.

According to a preferred embodiment of the present invention, the method preferably further comprises the management step of managing the database for each customer.

According to a preferred embodiment of the present invention, the management step preferably includes the step of permitting a given customer to access only information registered for the given customer among information registered in the database.

According to a preferred embodiment of the present invention, the apparatus is an exposure apparatus (e.g., a semiconductor manufacturing exposure apparatus).

According to a preferred embodiment of the present invention, the data processing step preferably includes the simulation step of preparing by simulation at least one bit of information of imaging performance, alignment accuracy, and throughput of the exposure apparatus.

According to a preferred embodiment of the present invention, the condition associated with the use of the apparatus preferably includes at least one of a use condition of the exposure apparatus, a substrate condition, and a mask condition.

According to a preferred embodiment of the present invention, preferably, the condition associated with the use of the apparatus includes an illumination mode and a mask condition, and the data processing step includes the step of preparing by simulation information concerning imaging performance of the exposure apparatus on the basis of the illumination mode and the mask condition.

According to a preferred embodiment of the present invention, preferably, the condition associated with the use of the apparatus further includes information concerning a substrate to be exposed, and the data processing step includes the step of preparing by simulation information concerning imaging information of the exposure apparatus on the basis of the illumination mode, the mask condition, and the substrate condition.

According to a preferred embodiment of the present invention, the substrate condition preferably further includes a structure of the substrate to be exposed and a type of a resist on the substrate.

According to a preferred embodiment of the present invention, the data processing step preferably includes the step of preparing by simulation information concerning an image intensity profile of a pattern to be formed on the substrate and information concerning a resist profile.

According to a preferred embodiment of the present invention, the data processing step preferably includes the step of preparing by simulation at least one bit of information of a resolving power, line width accuracy, line width uniformity, pattern distortion, and distortion.

According to a preferred embodiment of the present invention, preferably, the condition associated with the use of the apparatus includes target performance of the exposure apparatus, and the data processing step includes the step of preparing information for optimizing at least one of imaging performance, alignment accuracy, throughput, mix and match, shot layout, and global alignment shot layout of the exposure apparatus.

According to a preferred embodiment of the present invention, preferably, the condition associated with the use of the apparatus includes target imaging performance, and the data processing step includes the optimization step of preparing information for optimizing the condition in use of the exposure apparatus on the basis of the target imaging performance.

According to a preferred embodiment of the present invention, the optimization step preferably includes the step of preparing on the basis of the target imaging performance at least one of information for optimizing an illumination mode of the exposure apparatus, information for optimizing a projection optical system of the exposure apparatus, and information for optimizing a mask used for exposure.

According to a preferred embodiment of the present invention, the method preferably further comprises the registration step of registering an optimization result in the optimization step in a database.

According to a preferred embodiment of the present invention, the method preferably further comprises the management step of managing the database for each customer.

According to a preferred embodiment of the present invention, the management step preferably includes the step of permitting a given customer to access only information registered for the given customer among the information registered in the database.

According to the a preferred embodiment of the present invention, preferably, the optimization step includes the step of preparing on the basis of the target imaging performance at least one of information for optimizing an illumination mode of the exposure apparatus and information for optimizing a projection optical system of the exposure apparatus, and the method further comprises the step of transmitting to the exposure apparatus the information prepared in the optimization step.

According to a preferred embodiment of the present invention, preferably, the reception step includes the step of receiving from the customer a device condition concerning a device to be manufactured, an initial mask design concerning the device to be manufactured, target performance of the exposure apparatus, and apparatus condition concerning the exposure apparatus, the optimization step includes the step of preparing information for optimizing a mask subjected to exposure on the basis of the information received in the reception step, and the method further comprises the step of transmitting to a mask CAD provider information for optimizing a mask prepared in the optimization step, making the mask CAD provider prepare information for correcting the mask, and transmitting the mask correction information to the customer.

According to a preferred embodiment of the present invention, the optimization step preferably includes the step of preparing information for optimizing at least one of an optical proximity correction amount and a phase shift mask correction amount.

According to a preferred embodiment of the present invention, communications in the reception step and the transmission step are preferably performed via the Internet or a dedicated line.

The above information providing method can be controlled by, e.g., computer software.

According to another aspect of the present invention, there is provided an information providing system for providing to a customer information concerning an apparatus used by the customer by using a data communication network, the system comprising a reception unit for receiving a condition associated with use of the apparatus from a customer using the apparatus via the data communication network, a data processor for preparing information concerning the apparatus under a condition received by the reception unit by using secret apparatus data concerning the apparatus and managed by a supplier of the apparatus, and a transmission unit for transmitting the information prepared by the data processor to the customer through the data communication network. For example, this information providing system can be constructed by installing software in a general computer having a communication function such as a network interface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are views showing an example of optimizing the annular illumination conditions of an illumination system;

FIG. 6 is a view showing an example of optimizing a projection optical system.

DETAILED DESCRIPTION OF THE PREFERRED EMBODIMENTS

Preferred embodiments of the present invention will be described below.

According to a preferred embodiment of the present invention, a service provider receives from a customer conditions (e.g., apparatus use conditions, substrate conditions, mask conditions, and target performance) concerning the use of an apparatus such as an exposure apparatus (e.g., a semiconductor exposure apparatus) via a data communication network such as the Internet or a dedicated line. The service provider prepares information (e.g., performance and optimal conditions of the apparatus) concerning the apparatus under the conditions according to the reception by using secret apparatus data managed by an apparatus supplier, and returns the results to the customer.

A performance simulation is performed as follows. The service provider receives from the customer, via the data communication network, for example, apparatus use conditions, substrate conditions, mask conditions, performance data representing the current performance of the apparatus, and intermediate data representing the intermediate performance to be reflected on the final performance of the apparatus as conditions associated with the use of the apparatus. Performance simulation software installed in the computer of the service provider executes the performance simulation using the received data as input data. The performance simulation results are transmitted to the customer via the data communication network.

Optimization is performed as follows. The service provider receives from the customer via the data communication network, for example, target performance as the conditions associated with the use of the apparatus. Optimization software installed in the computer of the service provider executes optimization using the target performance as the input data. The optimization results are transmitted to the customer via the data communication network. Simulation results obtained by the performance simulation software for the apparatus performance under the optimal conditions can be transmitted to the customer together with the above optimization results.

Figure 1:
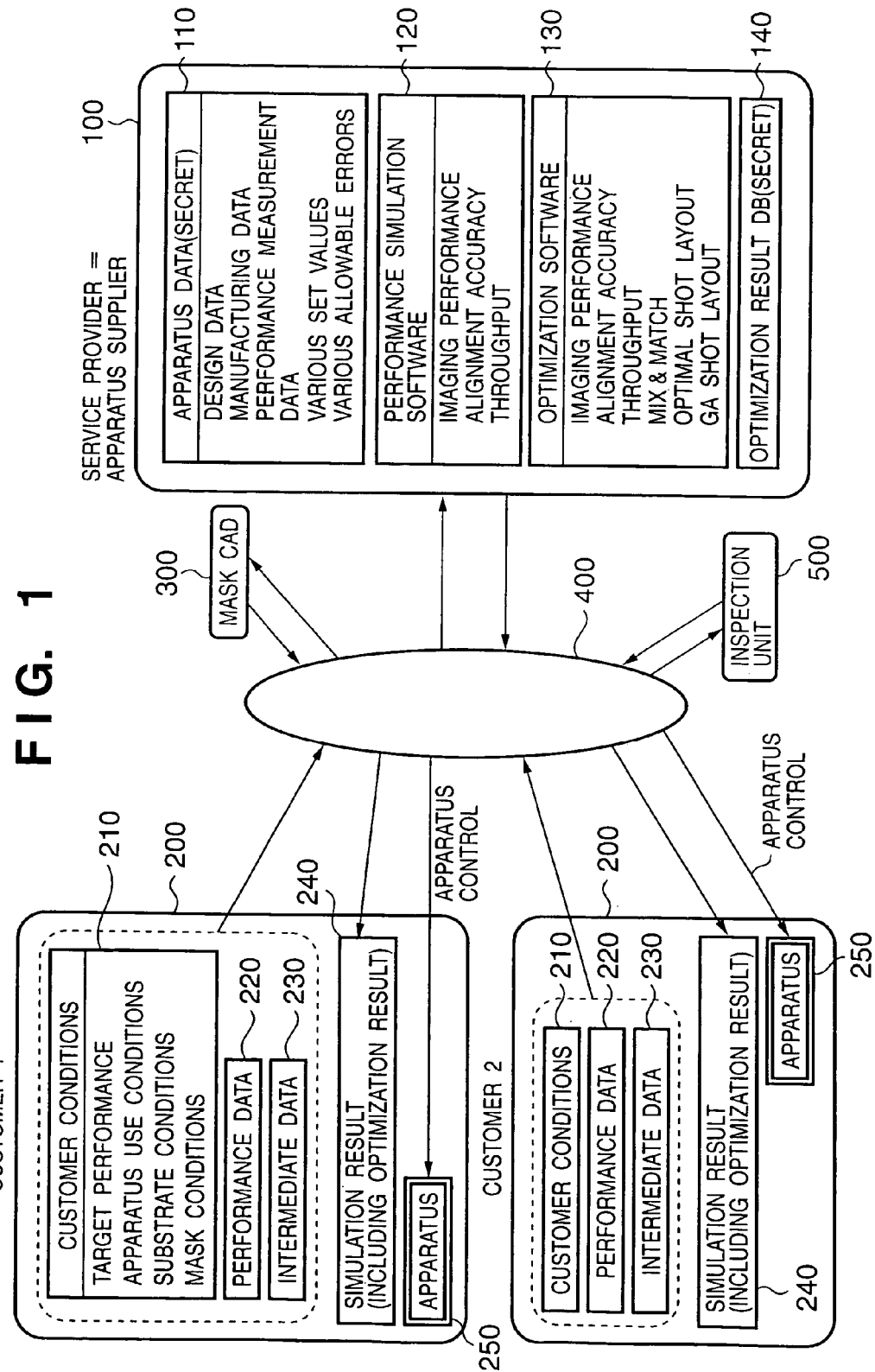
FIG. 1 is a view showing the schematic arrangement of an information providing system concerning a semiconductor exposure apparatus according to the first embodiment of the present invention.

FIG. 1 is a view showing the schematic arrangement of an information providing system concerning a semiconductor exposure apparatus according to the first embodiment of the present invention. In this embodiment, a service provider also serves as an apparatus supplier. A computer system 100 of a service provider (apparatus supplier) contains secret apparatus data 110, performance simulation software 120, performance optimization software 130, and a secret optimization result database 140. The computer system 100 is connected to one or more customers 200 via a data communication network 400, such as the Internet or dedicated line. As the hardware configuration of the computer system 100, the computer system 100 can employ the hardware configuration of a general computer system including, e.g., a CPU, a RAM, a ROM, a hard disk, a communication unit (e.g., a network interface such as a modem or a router), a keyboard, and a display. In the following description, the service provider (apparatus supplier) indicates the service provider (apparatus supplier) or the computer system thereof.

Examples of the secret apparatus data 110 are design data of a semiconductor exposure apparatus 250, manufacturing data of the apparatus, performance measurement data of the apparatus, various set data of the apparatus, and various allowable errors of the apparatus. In particular, the design data of a projection optical system of the semiconductor exposure apparatus, manufacturing data of the projection optical system, aberration and calculation values of the projection optical system, and aberration measurement values of the projection optical system are typically kept secret from customers as the know-how unique to the apparatus supplier.

The performance simulation software 120 simulates the performance of the semiconductor exposure apparatus 250 when customer conditions (e.g., apparatus use conditions, substrate conditions, or mask conditions) are given. The performance simulation software 120 contains simulation software concerning the imaging performance of the projection optical system of the semiconductor exposure apparatus 250, simulation software concerning alignment accuracy, simulation software concerning throughput, and the like. These software programs need not be secret. For example, simulation software concerning the imaging performance of the projection optical system may be commercially available software for any user.

The optimization software 130 is to determine optimal customer conditions for obtaining the target performance. The optimization software 130 contains optimization software programs for imaging performance, alignment accuracy, throughput, overlay accuracy (mix and match) between apparatuses, shot layout, global alignment (GA) shot layout, and the like.

The optimization result database 140 is a database of optimization results obtained by the various optimization software programs described above. When customer conditions (e.g., apparatus use conditions, substrate conditions, or mask conditions) are close to customer conditions already optimized, an optimization result is searched from this database 140, thereby omitting optimization using the optimization software. Alternatively, the optimization result found as a result of a search can be used as a start point, and optimization for only minor changes can be performed to simplify optimization.

Data transmitted from the customer 200 to the service provider (apparatus supplier) 100 include, e.g., customer conditions 210, performance data 220, and intermediate data 230. The customer conditions 210 include, e.g., target performance, apparatus use conditions, semiconductor substrate conditions, and mask conditions. The performance data 220 include, e.g., measurement values of imaging performance, alignment performance, and throughput of that semiconductor exposure apparatus 250 under the current conditions, which is delivered to the customer 200. The intermediate data 230 are data concerning intermediate performance which is not final performance, but can be reflected on the final performance. Examples of the intermediate data 230 are aberration measurement values obtained for the projection optical system of the semiconductor exposure apparatus 250, electrical signals obtained by measuring alignment marks in the apparatus, and the like.

The customer conditions 210, performance data 220, and intermediate data 230 are transmitted to the service provider (apparatus supplier) 100 via the data communication network 400 and are used for the performance simulation software 120 and/or optimization software 130 unique to the semiconductor exposure apparatus 250, together with the apparatus data 110 unique to the semiconductor exposure apparatus 250. The performance simulation software 120 executes a performance simulation on the basis of the received data and returns the performance simulation results to the customer 200 via the data communication network 400. The optimization software 130 executes optimization on the basis of the received data and returns the optimization results to the corresponding customer 200 via the data communication network 400. In addition, the optimization software 130 registers the optimization results in the optimization result database 140 together with the corresponding customer conditions 210, performance data 220, and intermediate data 230. The customer 200 can transmit to the service provider (apparatus supplier) 100 new customer conditions based on the received simulation or optimization results to make the performance simulation software 120 execute a simulation again. Alternatively, the customer 200 can reflect the optimization results on the semiconductor exposure apparatus 250 to improve the apparatus performance. The service provider (apparatus supplier) 100 can directly supply the optimization results to the corresponding semiconductor exposure apparatus 250 via the data communication network 400 to control this semiconductor exposure apparatus 250.

In optimizing imaging performance, optimization must often be performed while the mask pattern conditions of the customer are changed. In particular, to determine the limit of imaging performance, mask pattern optimization is important. The service system shown in FIG. 1 further comprises a mask CAD system 300 connected to the data communication network 400. This allows optimization of imaging performance including mask pattern conditions. The owner of the mask CAD system 300 may be a mask designer, customer himself, or service provider (apparatus supplier).

The imaging performance data are obtained by an inspection apparatus for automatically measuring and inspecting an exposed semiconductor substrate pattern. The information providing system shown in FIG. 1 further comprises an inspection apparatus 500 connected to the data communication network 400. Imaging performance data obtained by this inspection apparatus 500 can be transmitted to the customer and/or service provider via the data communication network 400. The repetition time for performance improvement can be shortened by using the imaging performance data measured as described above.

Figure 2:
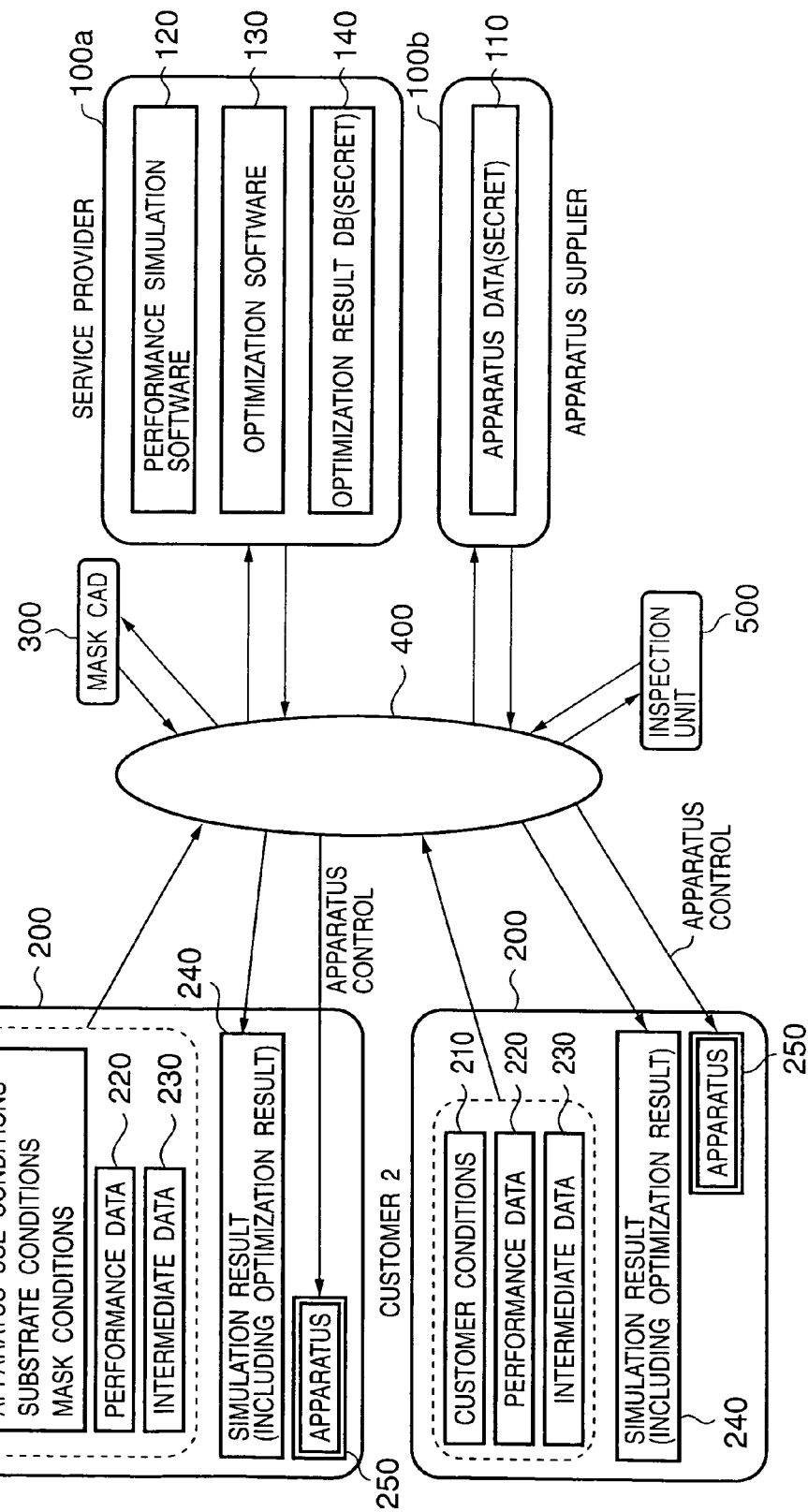
FIG. 2 is a view showing the schematic arrangement of an information providing system concerning a semiconductor exposure apparatus according to the second embodiment of the present invention.

FIG. 2 is a view showing a schematic arrangement of an information providing system when a service provider is different from an apparatus supplier. A computer system 100*a* of the service provider includes performance simulation software 120 and an optimization result database 130. Apparatus data 110 are under the management of an apparatus supplier 100*b* and provided in use for the service provider 100*a*. The service provider is liable to a non-disclosure duty for the apparatus supplier 100*b*. In addition, or in place of it, the apparatus data 110 provided from the apparatus supplier 100*b* to the computer system 100*a* of the service provider may be encrypted, and the performance simulation software 120 and optimization software 130 may use the encrypted data for only simulation and optimization.

The owners of the apparatus 110, performance simulation software 120, optimization software 130, and optimization result database 140 are not limited to the cases in FIGS. 1 and 2, but a variety of combinations can be considered. In an extreme case, a service provider does not own any of these, but may only provide and manage a service system and be engaged in charging and bill collection.

Data communication between the service provider and the customer may be directly performed between the computer system of the service provider and a computer in each exposure apparatus 250. However, as shown in FIG. 1 of Japanese Patent Laid-Open No. 10-97966 described previously, a plurality of exposure apparatuses delivered by an apparatus supplier are installed in a customer and are connected via a LAN. Data communications between the service provider and the customer may be performed between the computer system of the service provider and a host computer which manages the plurality of exposure apparatuses delivered to the customer.

The optimization result database 140 is managed for each customer. The customer conditions and the corresponding optimization result database 140 are protected by a security system using a password, or the like, such that they can be accessed by the authentic customer (i.e., the customer who transmitted these customer conditions), but cannot be accessed by other customers. Note that the service provider can access the optimization result databases 140 of all the customers to search for an optimal optimization result in searching for past similar customer condition optimization results on the basis of the received customer conditions. Service fees are decided on the basis of the contents of services such as performance simulation and optimization, access time, and priorities. The specifications indicating the executed service contents are automatically recorded, and the customer is automatically charged.

Figure 3:
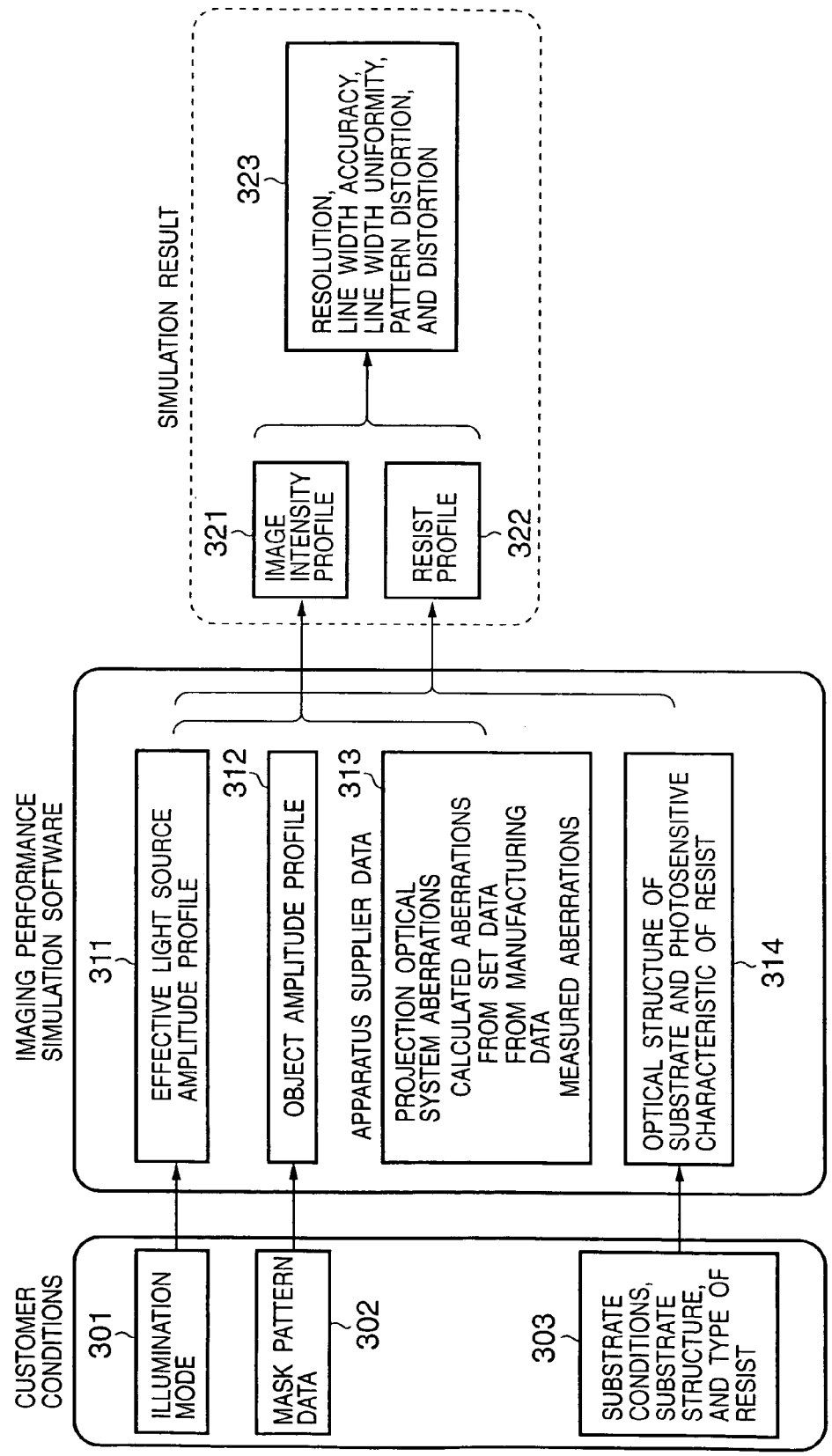
FIG. 3 is a flow chart showing the details of an imaging performance simulation.

FIG. 3 shows the detailed imaging performance simulation by imaging performance simulation software serving as one of the software programs of the performance simulation software 130. An illumination mode (an example of apparatus use conditions) 301 transmitted from a customer to the service provider is converted into an effective light source amplitude profile 311 by the imaging performance simulation software of the service provider. The illumination mode 301 includes so-called deformed illumination (e.g., annular illumination and quadrupole illumination) in addition to normal circular illumination. Each illumination mode includes a variety of modes having different data such as the illumination diameter at the incident pupil of a projection optical system and illumination coordinate positions.

Mask pattern data (an example of mask conditions) 302 transmitted from a customer to the service provider is converted into a mask transmittance amplitude profile (object amplitude profile) 312 by the imaging performance simulation software. For a phase shift mask, this amplitude profile includes negative values in addition to positive values. The amplitude profile generally has complex values.

Data 313 concerning the aberrations of the projection optical system of the semiconductor exposure apparatus 250 are data reserved and used only by the apparatus supplier. The data 313 are not usually disclosed to customers. The aberration values may be ones calculated from the design or manufacturing data of the projection optical system or ones measured in each projection optical system actually manufactured.

Substrate conditions 303 transmitted from a customer to the service provider include a substrate structure, the type of resist, and the like. The substrate structure indicates, e.g., names of various materials forming a substrate, and its thickness and sectional shape. The imaging performance simulation software determines optical constants such as refractive index and absorbance using data registered in the database on the basis of the material names, thereby determining an optical structure 314 of the substrate. Based on information concerning the type of resist, the imaging performance simulation software determines the optical constant or photosensitive characteristic 314 of the resist using the data registered in the database.

On the basis of the effective light source amplitude profile 311, object amplitude profile 312, and aberrations 313 of the projection optical system, the imaging performance simulation software calculates an image intensity profile (imaging performance) 321 of a pattern to be formed on the substrate. The imaging performance simulation software may be software usable by only the service provider and apparatus supplier, or software usable by an unspecified user, such as CODE V available from ORA, or OLSO SIX, available from Sinclair Optics.

A resist profile 322 can be calculated on the basis of the optical structures of the substrate and resist and the sensitivity characteristic 314 of the resist in addition to the effective light source amplitude profile 311, object amplitude profile 312, and the aberrations 313 of the projection optical system. Examples of resist profile calculation software available to an unspecified user are Prolith 3D available from Finle Technologies and SOLID-C available from SIGMA-C.

The image intensity profile 321 and the resist profile 322 are obtained for each shot or each point in a shot on a wafer. The resultant data are processed to obtain a resolving power, line width uniformity, pattern distortion, distortion, or the like 323. These simulation results are sent back to the customer via the data communication network.

Figure 4:
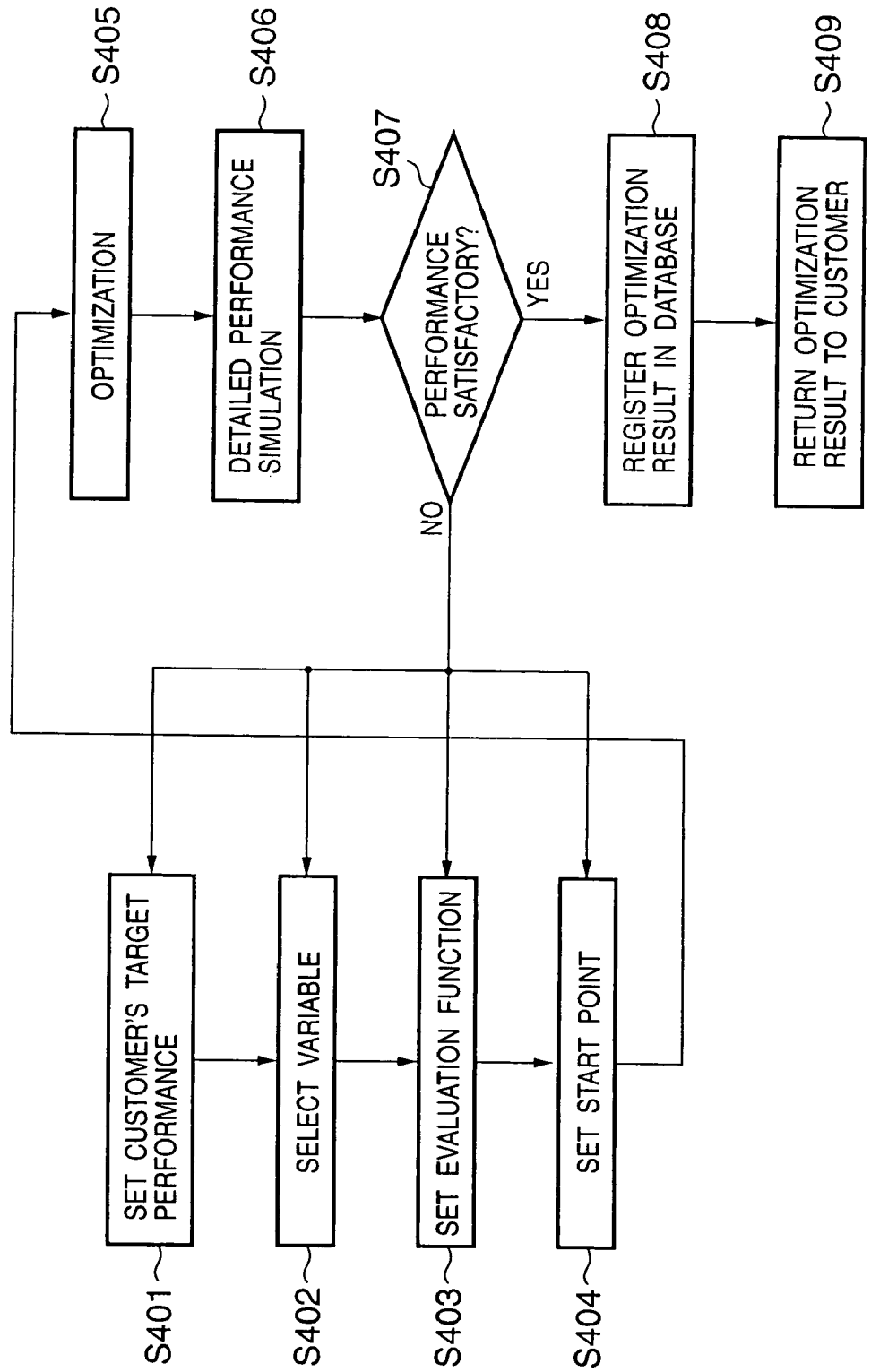
FIG. 4 is a flow chart showing an example of an optimization flow.

FIG. 4 shows an example of an optimization flow accompanying performance simulation. This optimization is executed by the computer system 100 (100a) of the service provider. Note that processing in this flow can be controlled by software (information providing software) installed in the computer system 100. This software is distributed in the form of a memory medium such as a CD-ROM. The performance simulation software 120 and optimization software 130 may be contained in this software. Alternatively, this software may call the performance simulation software 120 and optimization software 130 as needed.

In step S401, a customer inputs target performance via the data communication network 400. In step S402, the customer inputs the types of customer conditions (variables) to be optimized and the degree of importance of each performance via the data communication network 400. In step S403, an evaluation function for providing the measure of the achieved level of a target on the basis of the input data is determined. A smaller value calculated by this evaluation function is interpreted as a higher achieved level of target. In step S404, current customer conditions or past similar customer conditions search from the optimization result database 140 are set as the start point of optimization.

In step S405, the optimization software 130 executes optimization in accordance with the set conditions. This optimization is performed using various known optimization algorithms to be described later. In step S406, the performance simulation software 130 executes a detailed performance simulation on the basis of the optimization result. This performance simulation result (or optimization result) does not necessarily satisfy the customer. For example, when the start point or evaluation function is not properly set, the customer is not satisfied with the performance simulation result.

It is determined in step S408 whether the performance (performance simulation result) satisfies the customer. If NO in step S408, all or some of steps S401 to S404 are executed again. Whether the performance simulation result satisfies the customer may be determined in accordance with, e.g., whether the simulation result reaches the target performance, or determined by transmitting the simulation result via the data communication network 400 and making the customer judge the simulation result.

Typically, when the performance does not satisfy the customer, a new start point is set (S404) or a new evaluation function is determined (S403). The optimization simulation (S405) and performance simulation (S406) are done using these new set values. If performance which satisfies the customer cannot be obtained, new variables are selected (S402) or new target performance is set (S401). The optimization simulation (S405) and performance simulation (S406) are done again using the new set values. If a satisfactory performance is obtained (YES in step S407), the optimization result is registered in the optimization result database 140 and transmitted to the customer 200 in step S408. In this case, preferably, the performance simulation result is transmitted to the customer 200 together with the optimization result.

FIGS. 5A to 5C are views showing an example of optimizing the annular illumination conditions of an illumination system of the semiconductor exposure apparatus 250. In this example, a pattern line width target accuracy of 0.2±0.2 μm of nine points within an exposure shot is the target performance. Conditions desired by the customer to be optimized are annular illumination conditions of the illumination system. These conditions are an outer diameter $R_1$ and inner diameter $R_2$ normalized by the incident pupil diameter of the projection optical system (see FIGS. 5A and 5B). For example, values currently used by the customer, e.g., $R_1=0.5$ and $R_2=0.1$ are set as the start point for optimizing $R_1$ and $R_2$. Assume that the line width simulation values of the nine points with respect to any $(R_1, R_2)$ are given as $W_1(R_1, R_2), W_2(R_1, R_2), \ldots, W_9(R_1, R_2)$. A value $M(R_1, R_2)$ obtained by multiplying the sum of squares of offsets $W_1(R_1, R_2)-0.2$ μm, $W_2(R_1, R_2)-0.2$ μm, . . . , $W_9(R_1, R_2)-0.2$ μm with an appropriate coefficient K is defined as an evaluation function. Optimization is performed for the desired customer conditions by obtaining $(R_1, R_2)$ for minimizing the value of the evaluation function. In this case, since two variables are used, fine performance simulation can be performed for all possible combinations of ($R_1$, $R_2$) to select an optimal ($R_1$, $R_2$) combination. However, since a customer generally requests a large number of conditions (target performance) for optimization and a large number of variables to be optimized are used, optimization according to the above method has poor efficiency. When a large number of variables are used, an optimal point is obtained while executing the sequential optimization step (S405) from the start point in accordance with any of various known optimization algorithms, such as the method of least squares, the method of damped least squares, and the orthogonalization method (see FIG. 5C). These algorithms are known well in the optimization technique of automatic lens design. For example, the former two algorithms are explained in Yoshiya Matsui "Lens Design Method", KYORITSU SHUPPAN, p. 131.

The optimal $R_1$ (normalized outer diameter of annular illumination) and $R_2$ (normalized inner diameter of annular illumination) thus obtained are registered in the optimization result database 140 and at the same time transmitted to the customer 200. The customer 200 changes the illumination mode of the semiconductor exposure apparatus 250. Alternatively, the $R_1$ and $R_2$ data may be directly transmitted to a control system (not shown) of the illumination system of the semiconductor exposure apparatus 250 to automatically optimize the illumination mode of the illumination system on the basis of the data. As a means for realizing the change in illumination mode, a means disclosed in Japanese Patent Laid-Open No. 5-251308 can be used.

An example of optimizing the projection optical system of the semiconductor exposure apparatus 250 upon optimizing the illumination mode will be described with reference to FIG. 6. In the example shown in FIG. 6, a case will be described wherein distances $D_1$, $D_2$, and $D_3$ from reference positions of three proper lenses of a projection optical system 610, and an NA stop diameter P are slightly changed to obtain optimal lens positions and optimal NA, which satisfy the conditions requested by the customer. As the three lenses, lenses having larger changes in spherical aberration, coma, and astigmatism than those in other aberrations with changes in lens positions are selected. The current lens positions are defined as the start point for optimizing the positions of these lenses. As in optimization of the illumination mode, assume that the line width simulation values of nine points with respect to any ($D_1$, $D_2$, $D_3$, P) are defined as $W_1(D_1, D_2, D_3, P)$, $W_2(D_1, D_2, D_3, P)$, . . . , $W_9(D_1, D_2, D_3,P)$. A value $M(D_1, D_2, D_3, P)$ obtained by multiplying the sum of squares of offsets $W_1(D_1, D_2, D_3, P)$–0.2 μm, . . . , $W_9(D_1, D_2, D_3, P)$–0.2 μm from these simulation values with an appropriate coefficient K is defined as an evaluation value. Optimization is performed for the desired customer conditions by obtaining ($D_1$, $D_2$, $D_3$, P) for minimizing the value of the evaluation function. In this case, as in optimization of the illumination mode, fine performance simulation can be performed for all possible combinations of ($D_1$, $D_2$, $D_3$, P) to select an optimal ($D_1$, $D_2$, $D_3$, P) combination. An optimal point is obtained while executing the sequential optimization step (S405) from the start point in accordance with the known optimization algorithms described above. The optimal value ($D_1$, $D_2$, $D_3$, P) thus obtained is directly transmitted as the projection optical system control data from the service provider to a projection optical system control system 601. The lens positions and NA of the projection optical system 610 are automatically optimized by first, second, and third lens drivers 602, 603, and 604, and an NA stop driver 605 on the basis of the transmitted data.

The illumination system and projection optical system need not be optimized independently of each other, but may be simultaneously optimized. For example, optimization can be performed by selecting the projection optical system incident pupil sufficiency degree (σ) of annular illumination and the NA of the projection optical system are selected as the variables of the illumination system.

Figure 7:
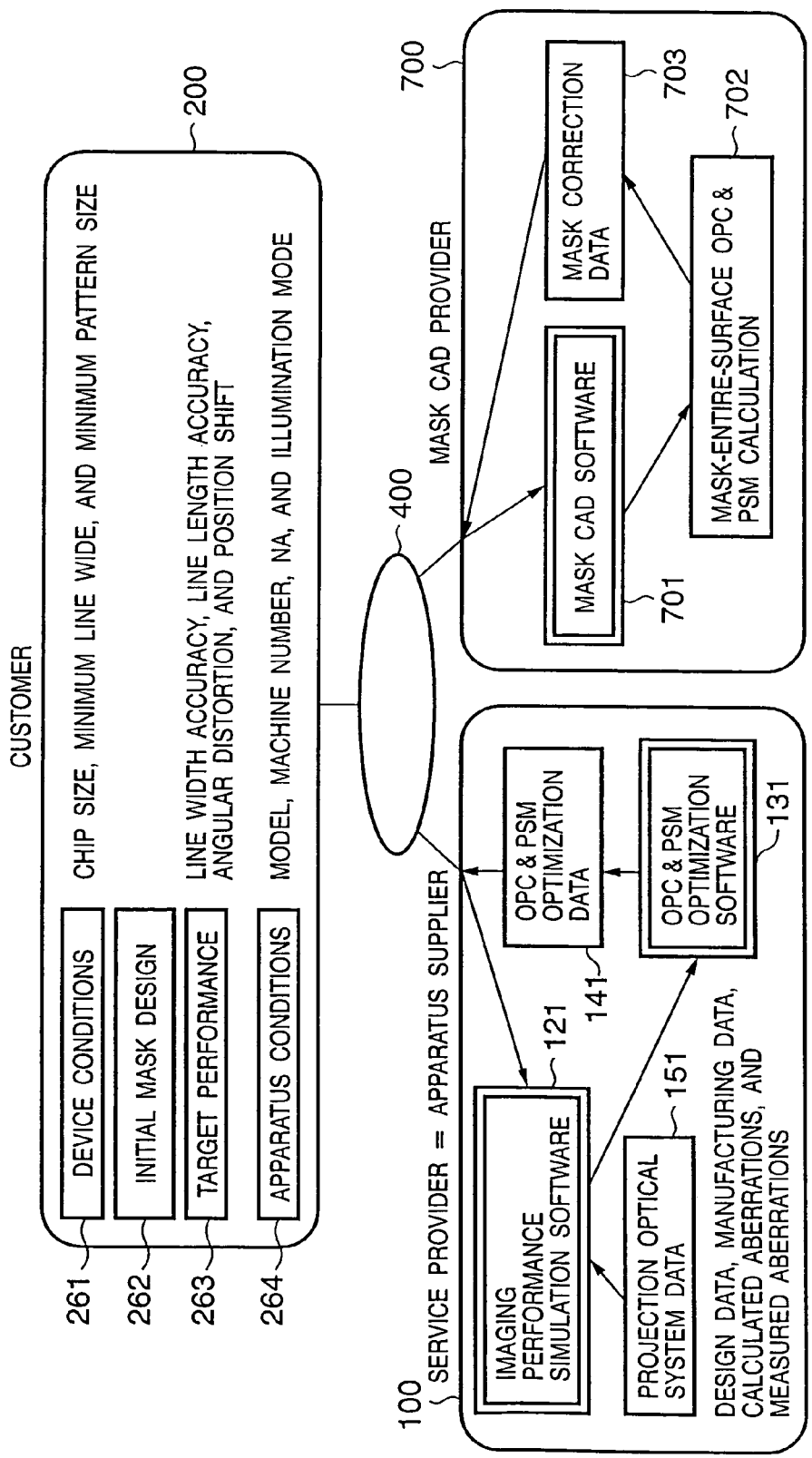
FIG. 7 is a view showing an example of optimizing mask conditions.

FIG. 7 is a view showing an example of optimizing mask conditions of the customer conditions. Device conditions 261, initial mask design 262, target performance 263, and apparatus conditions 264 are transmitted from the customer 200 to the computer system 100 of the service provider (also serving as the apparatus supplier) and a computer system 700 of the mask CAD provider. The device conditions 261 include, e.g., a chip size, minimum line width, and minimum pattern size. The initial mask design 262 represents mask pattern data designed on the basis of only the apparatus specifications at the time of purchase of the apparatus without considering projection optical system data under the management of the apparatus supplier. The target performance 263 includes, e.g., the line width accuracy, line length accuracy, pattern angle distortion amount, and pattern position shifts of a plurality of specific patterns in a chip. The apparatus conditions 264 include, e.g., the model and machine number of an exposure apparatus, the NA of the projection optical system, and illumination modes used. The computer system 100 of the service provider uses imaging performance simulation software 121 to calculate imaging performance corresponding to the target performance requested by the customer 200, on the basis of the above pieces of information and projection optical system data (e.g., design data, manufacturing data, calculated aberrations, and measured aberrations) 151 under the management of the service provider. The imaging performance simulation software 121 then detects offsets from the target performance. In addition, the computer system 100 of the service provider uses an optical proximity correction amount (to be referred to as an OPC hereinafter) and phase shift mask pattern correction amount (to be referred to as a PSM hereinafter) as variables and the sum of squares of the difference between each performance and each target performance as an evaluation function so as to correct the offsets by changing the mask design and makes optimization software 131 calculate an optimal OPC and PSM for the plurality of specific patterns designated by the customer by using the optimization algorithms described above. This optimization is different from those of the illumination conditions and projection optical system described above except that the object amplitude profile 312 itself in FIG. 3 is changed on the basis of the OPC and PSM values when these values are defined as variables. The optimization technique for the mask conditions are the same as those for the illumination conditions and projection optical system. The calculated optimal OPC and PSM data are transmitted to the computer system 700 of the mask CAD provider.

The computer system 700 of the mask CAD provider calculates OPC and PSM values on the entire surface of a mask in consideration of various restrictions by mask CAD software 701 on the basis of the device conditions received from the customer 200 and the optimized OPC and PSM data received from the computer system 100 of the service provider. The computer system 700 calculates mask-entire-surface correction data on the basis of the OPC and PSM data on the entire surface of the mask and transmits it to the customer 200.

A simulation result by the performance simulation software may not match the actual performance because a simulation algorithm is simplified by shortening the simulation time and simulation software cannot catch up with the sophisticated lithography process. To correct the mismatch, performance data obtained by actually this mismatch, performance data obtained by actually operating the apparatus or intermediate data are transmitted from the customer to the service provider, as needed, and monitored to improve simulation accuracy.

The service systems for the semiconductor exposure apparatus according to the present invention have been described with reference to the imaging performance. Similar methods can be employed for optimization and optimization result databases of the alignment accuracy, throughput, overlay accuracy (mix and match) between apparatuses, shot layout, and global alignment shot layout, although simulation software programs are different from that for the imaging performance.

Each embodiment described above has a semiconductor exposure apparatus as a target. However, the information providing system is applicable to any other apparatus (e.g., a manufacturing apparatus, a processing apparatus, an inspection apparatus, and a robot).

According to the present invention, information (e.g., performance and optimal conditions) concerning an apparatus, such as an exposure apparatus, under conditions (e.g., use conditions and target performance) associated with the use of the apparatus can be quickly provided to the customer.

As many apparently widely different embodiments of the present invention can be made without departing from the spirit and scope thereof, it is to be understood that the invention is not limited to the specific embodiments thereof except as defined in the appended claims.

What is claimed is:

1. An information providing system comprising:
   a reception unit configured to receive first information concerning a use condition of a customer's exposure apparatus for exposing a substrate to a pattern, from a customer's system including the exposure apparatus via a network;
   a processing unit configured to simulate a process to be performed by the customer's exposure apparatus under the use condition based on the first information and to prepare second information concerning a performance of the customer's apparatus under the use condition based on the simulation; and
   a transmission unit configured to transmit the second information to the customer's system via a network.

2. A system according to claim 1, wherein said processing unit is configured to simulate the process based on at least one of design data, manufacturing data, performance measurement data, a set value and an allowable error of the customer's exposure apparatus.

3. A system according to claim 1, further comprising a registration unit configured to register the second information in a database.

4. A system according to claim 3, wherein said registration unit is configured to register the second information in the database with respect to each customer.

5. A system according to claim 1, wherein the first information includes information concerning at least one of the substrate, a resist to be coated onto the substrate, a mask for providing the pattern and an illumination condition to be applied to the mask.

6. A system according to claim 1, wherein the second information includes information concerning at least one of an imaging performance, a resist profile, an alignment accuracy, a throughput, and an overlay accuracy to be obtained by the customer's exposure apparatus.

7. A system according to claim 1, wherein said transmission unit is configured to transmit the second information to the customer's exposure apparatus.

8. An information providing method, comprising steps of:
   receiving first information concerning a use condition of a customer's exposure apparatus for exposing a substrate to a pattern, from a customer's system including the exposure apparatus via a network;
   simulating a process to be performed by the customer's exposure apparatus under the use condition based on the first information;
   preparing second information concerning a performance of the customer's exposure apparatus under the use condition based on the simulation; and
   transmitting the second information to the customer's system via a network.

9. A method according to claim 8, wherein said processing step simulates the process based on at least one of design data, manufacturing data, performance measurement data, a set value and an allowable error of the customer's exposure apparatus.

10. A method according to claim 8, further comprising a step of registering the second information in a database.

11. A method according to claim 10, wherein said registering step registers the second information in the database with respect to each customer.

12. A method according to claim 8, wherein the first information includes information concerning at least one of the substrate, a resist to be coated onto the substrate, a mask for providing the pattern and an illumination condition to be applied to the mask.

13. A method according to claim 8, wherein the second information includes information concerning at least one of an imaging performance, a resist profile, an alignment accuracy, a throughput, and an overlay accuracy to be obtained by the customer's exposure apparatus.

14. A method according to claim 8, wherein said transmission step transmits the second information to the customer's exposure apparatus.

15. A computer-readable storage medium which stores instructions for execution by a computer, which executes an information providing method, said method comprising steps of:
   receiving first information concerning a use condition of a customer's exposure apparatus for exposing a substrate to a pattern, from a customer's system including the exposure apparatus via a network;
   simulating a process to be performed by the customer's exposure apparatus under the use condition based on the first information;
   preparing a second information concerning a performance of the customer's exposure apparatus under the use condition based on the simulation; and
   transmitting the second information to the customer's system via a network.

16. An information providing system comprising:
   a reception unit configured to receive first information concerning a target performance of a customer's exposure apparatus for exposing a substrate to a pattern, from a customer's system including the exposure apparatus via a network;
   a processing unit configured to determine a use condition of the customer's exposure apparatus based on the first information and to prepare second information concerning the determined use condition; and a transmission unit configured to transmit the second information to the customer's system via a network.

17. A system according to claim 16, wherein the first information includes information concerning a current performance of the customer's exposure apparatus.

18. A system according to claim 17, wherein the current performance information includes information obtained by an inspection unit which inspects a performance of the customer's exposure apparatus.

19. A system according to claim 17, wherein the current performance information includes information obtained by a measurement in the customer's exposure apparatus.

20. A system according to claim 16, wherein said processing unit is configured to simulate a process to be performed by the customer's exposure apparatus, to evaluate the simulation based on the first information, and to determine the use condition based on the evaluation.

21. A system according to claim 16, further comprising a registration unit configured to register the second information in a database.

22. A system according to claim 21, wherein said registration unit is configured to register the second information in the database with respect to each customer.

23. A system according to claim 16, wherein the first information includes information concerning at least one of the substrate, a resist to be coated onto the substrate, a mask for providing the pattern and an illumination condition to be applied to the mask.

24. A system according to claim 16, wherein the first information includes information concerning at least one of an imaging performance, a resist profile, an alignment accuracy, a throughput, and an overlay accuracy to be obtained by the customer's exposure apparatus.

25. A system according to claim 16, wherein the second information includes information concerning at least one of a shot layout, an illumination condition to be applied to the mask, a condition with respect to a projection optical system for projecting the pattern onto the substrate and a mask design of a mask for providing the pattern.

26. A system according to claim 16, further comprising a mask CAD unit configured to obtain information of a design of a mask for providing the pattern as the second information.

27. A system according to claim 16, wherein said transmission unit is configured to transmit the second information to the customer's exposure apparatus.

28. An information providing method, comprising steps of:

receiving first information concerning a target performance of a customer's exposure apparatus for exposing a substrate to a pattern, from a customer's system including the exposure apparatus via a network;

determining a use condition of the customer's exposure apparatus based on the first information;

preparing second information concerning the determined use condition; and transmitting the second information to the customer's system via a network.

29. A method according to claim 28, wherein the first information includes information concerning a current performance of the customer's exposure apparatus.

30. A method according to claim 28, wherein said processing step comprises simulating a process to be performed by the customer's exposure apparatus, evaluating the simulation based on the first information, and determining the use condition based on the evaluation.

31. A method according to claim 28, wherein the current performance information includes information obtained by an inspection unit which inspects a performance of the customer's exposure apparatus.

32. A method according to claim 28, wherein the current performance information includes information obtained by a measurement in the customer's exposure apparatus.

33. A method according to claim 28, further comprising a step of registering the second information in a database.

34. A method according to claim 33, wherein said registering step registers the second information in the database with respect to each customer.

35. A method according to claim 28, wherein the first information includes information concerning at least one of the substrate, a resist to be coated on the substrate, a mask for providing the pattern and an illumination condition to be applied to the mask.

36. A method according to claim 28, wherein the first information includes information concerning at least one of an imaging performance, a resist profile, an alignment accuracy, a throughput, and an overlay accuracy to be obtained by the customer's exposure apparatus.

37. A method according to claim 28, wherein said determining step obtains information of a design of a mask for providing the pattern as the use condition.

38. A method according to claim 28, wherein said transmitting step transmits the second information to the customer's exposure apparatus.

39. A computer-readable storage medium which stores instructions for execution by a computer, which executes an information providing method, said method comprising steps of:

receiving first information concerning a target performance of a customer's exposure apparatus for exposing a substrate to a pattern, from a customer's system including the exposure apparatus via a network;

determining a use condition of the customer's exposure apparatus based on the first information;

preparing second information concerning the determined use condition; and transmitting the second information to the customer's system via a network.

* * * * *